US006990215B1

(12) United States Patent
Brown et al.

(10) Patent No.: US 6,990,215 B1
(45) Date of Patent: Jan. 24, 2006

(54) PHOTOGRAMMETRIC MEASUREMENT SYSTEM AND METHOD

(75) Inventors: John D. Brown, West Melbourne, FL (US); Giuseppe Ganci, Melbourne, FL (US); Harry B. Handley, Brunswick East (AU)

(73) Assignee: Geodetic Services, Inc., Melbourne, FL (US)

( * ) Notice: Subject to any disclaimer, the term of this patent is extended or adjusted under 35 U.S.C. 154(b) by 676 days.

(21) Appl. No.: 09/919,378

(22) Filed: Jul. 31, 2001

Related U.S. Application Data

(60) Provisional application No. 60/221,702, filed on Jul. 31, 2000.

(51) Int. Cl.
*G06K 9/00* (2006.01)

(52) U.S. Cl. ...................... 382/106; 382/154
(58) Field of Classification Search ............... 382/103, 382/106, 107, 108, 154; 396/153; 356/3, 356/3.02, 3.15, 3.16, 4.01, 21.22, 601, 606, 356/614, 602, 610, 617, 620, 628, 635; 702/5, 702/94, 95, 150, 152, 153, 155, 156; 250/559.29, 250/559.31, 559.32, 559.36, 559.38, 559.44, 250/559.47, 206.1, 206.2, 208.6, 491.1, 363.06; 348/94, 95; 342/450, 451
See application file for complete search history.

(56) References Cited

U.S. PATENT DOCUMENTS

| | | | | |
|---|---|---|---|---|
| 5,603,318 A | * | 2/1997 | Heilbrun et al. | 600/426 |
| 5,805,289 A | * | 9/1998 | Corby et al. | 356/613 |
| 6,460,004 B2 | * | 10/2002 | Greer et al. | 702/104 |
| 2004/0150816 A1 | * | 8/2004 | Wakashiro et al. | 356/243.1 |

OTHER PUBLICATIONS

Brown, John, "V-Stars Acceptance Test Results," presented at the Boeing Large Scale Metrology Conference in Seattle, 7 pages, Jan. 1998.
Fraser, Clive, "Automation in Digital Close-Range Photogrammetry," 5 pages, Newcastle, Apr. 1997.
Fraser, Clive, "Innovations in Automation for Vision Metrology Systems," Photogrammetric Record, pps. 901-911, Oct. 1997.
Ganci, Giuseppe, and Brown, John, "Developments in Non-Contact Measurement Using Videogrammetry," 6 pages, 2000.
Ganci, G. and Handley, H., "Automation in Videogrammetry," International Archives of Photogrammetry and Remote Sensing, 4 pages, 1998.

* cited by examiner

*Primary Examiner*—Andrew W. Johns
*Assistant Examiner*—Shervin Nakhjavan
(74) *Attorney, Agent, or Firm*—Allen, Dyer, Doppelt, Milbrath & Gilchrist, P.A.

(57) ABSTRACT

A method for characterizing a geometric element of an object includes positioning a calibrated target adjacent a calibration geometric element, the calibrated target having at least two differentially detectable features having a known geometric relationship to each other. Next a relationship of the calibrated target to the calibration geometric element is determined, and the calibrated target is moved adjacent a geometric feature of an object desired to be characterized. Then photogrammetry is applied to the calibrated target features and the desired geometric feature to spatially characterize the desired geometric feature. A system for characterizing a geometric element of an object includes the movable calibrated target and a photogrammetric analysis system for determining a relationship of the calibrated target to a calibration geometric element and for spatially characterizing the desired geometric feature using the calibrated target features.

43 Claims, 9 Drawing Sheets

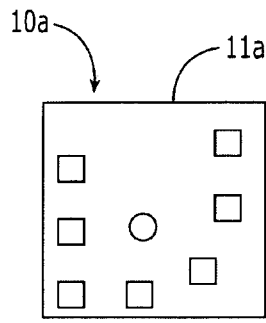
FIGURE 7A
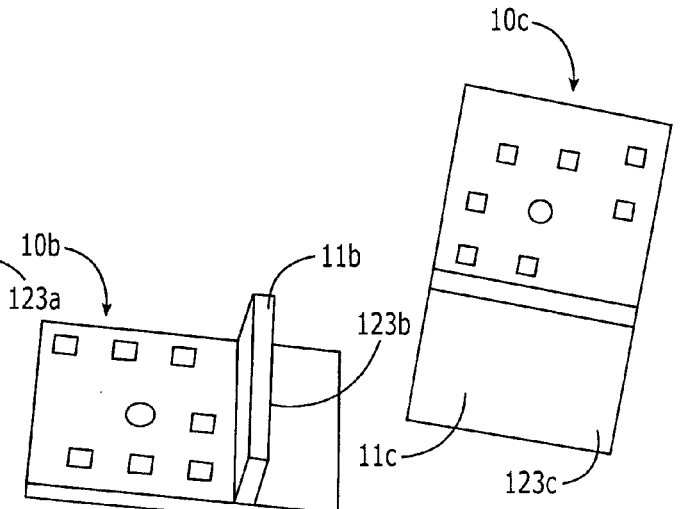
FIGURE 7B
FIGURE 7C
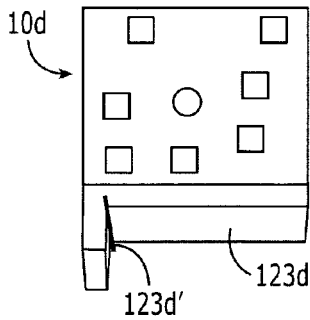
FIGURE 7D
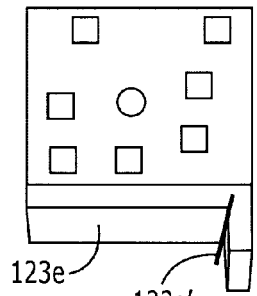
FIGURE 7E
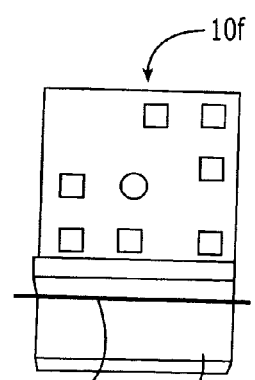
FIGURE 7F
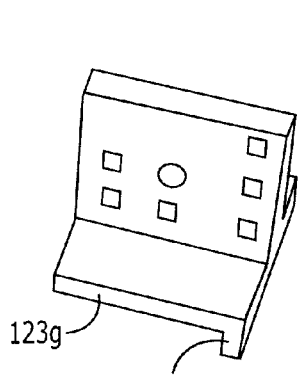
FIGURE 7G
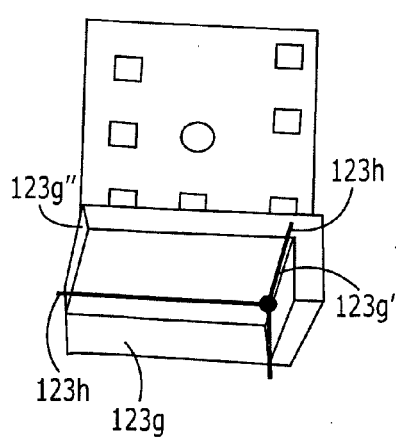
FIGURE 7H
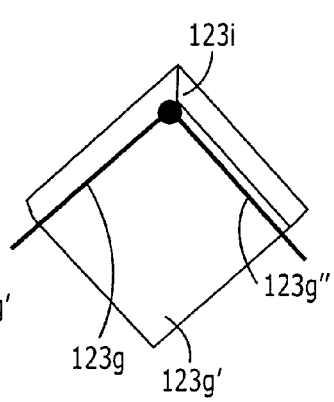
FIGURE 7I

PHOTOGRAMMETRIC MEASUREMENT SYSTEM AND METHOD

CROSS-REFERENCE TO RELATED APPLICATION

This application claims priority from provisional application No. 60/221,702, filed Jul. 31, 2000, entitled "Photogrammetric Measurement System and Method."

BACKGROUND OF THE INVENTION

1. Field of the Invention

The present invention relates to systems and methods for remote measurement of geometric features on an object, and, more particularly, to such systems and methods that are photogrammetrically based.

2. Description of Related Art

Photogrammetry is a fast, accurate three-dimensional measurement method based on photographic principles. In a single-camera or sequential mode of photogrammetry, a single high-resolution digital camera takes multiple pictures of an object from different locations. These pictures are then automatically processed to yield three-dimensional coordinates of points on an object (Ganci and Handley, 1998).

The sequential mode is not real time; so it can only measure static objects and targeted points. However, it is well suited to high-accuracy measurement of large, complicated objects, since virtually any number of pictures can be taken and processed. In addition, the photography is usually quick; so production downtime is low, and temperature effects are minimized. The use of the sequential method of photogrammetry on a typical measurement is illustrated in FIG. 1, wherein the user 90 is shown taking pictures of an object 91 from three locations 71,72,73 sequentially.

Sequential photogrammetry has other attractive attributes, including high accuracy, portability, and the ability to perform measurements in unstable or vibrating environments (Brown, 1998). All these attributes combined with the present invention are believed to make sequential photogrammetry a compelling choice for numerous applications in the automotive industry.

Three-dimensional inspection within an automotive environment has been known to be conducted within a coordinate measurement machine (CMM) room. The CMM room typically has several stationary gantry-type CMMs dedicated to a certain class of dimensional inspection. This class of inspection is most notably characterized by the need to bring the part to be measured to the CMM. Such a constraint instantly disqualifies traditional CMMs from inspecting the tooling fixtures that are located on the assembly line. These fixtures are in fact the most important items measured in the factory, as they control the dimensions and fit-up of the subassemblies throughout the manufacturing process. In-line production measurements are also impossible using CMM systems.

It would thus be desirable to have a portable system that can measure items in place for a number of applications. Although numerous portable, in-place measurement systems exist, they typically rely on touching the desired features with some type of probe or measuring adapter that is usually held in place by an operator. For many applications, access to the object is limited, making setup of the instrument difficult. Furthermore, touching the desired features with the measuring device can be difficult, tedious, and prone to lead to measurement errors.

For many automotive inspection tasks it is necessary quickly to collect and process feature data. One limiting factor in the use of photogrammetry for feature measurement in the past has been the need for point-of-interest targeting. For example, if a plane is desired to be measured, then at least three points (>3 for redundancy) need to be applied to the surface that defines that plane. Similar requirements apply to other geometric features, such as circles and lines. In some instances, point-of-interest targeting cannot be used to define the feature.

An edge is one example of a feature that cannot be directly targeted. Typically, a special target adapter is needed to define the edge 92, or the edge is determined indirectly via the intersection of two planes 93,94 (FIG. 2). The example of an edge can be extended to a corner via the addition of another plane and a line—line intersection to produce the corner. Traditionally, target adapters have been used to bypass some of the problems associated with measuring difficult features such as edges and corners. The time penalty for these adapters comes at the processing stage, when they need to be identified and reduced to yield the desired feature.

An alternative to stick-on targeting when using photogrammetry is the use of hand-held probes to touch points of interest (Ganci and Brown, 2000). Three exemplary probes 95–97 (FIGS. 3A–3C) each have a standard tip 98, similar to that used on conventional CMMs. In addition, each probe 95–97 has five permanent targets 99. In use, two or more cameras simultaneously view these targets 99 and calculate their xyz position. From the xyz position of the five targets 99, the probe tip 98 position can be calculated.

Probes have been successfully used in automotive applications for many years. However, in some applications setting up the cameras for measuring the object is difficult. Furthermore, many features are difficult to probe accurately, especially in the tight spaces and difficult conditions encountered in many measurements.

Sequential photogrammetry can often acquire data rapidly since photography is very quick. However, sometimes the need to target the desired features is difficult and time consuming. If, instead, a probing tool is used, there is typically a setup time for the instrument followed by laborious probing and analysis of each feature. The present invention is directed to reducing setup time and also to removing the requirement for probing features.

SUMMARY OF THE INVENTION

It is therefore an object of the present invention to provide a system and method for measuring geometric features of an object.

It is an additional object to provide such a system and method particularly adapted for difficult-to-measure features.

It is a further object to provide such a system and method that use a targeted adaptor.

It is another object to provide such a system and method that incorporate digital photogrammetry.

It is yet an additional object to provide such a system and method that are adapted for use in the automotive industry.

These objects and others are attained by the present invention, an embodiment of which is a method for characterizing a geometric element of an object. The method comprises the step of positioning a calibrated target adjacent a calibration geometric element. The calibrated target comprises at least two differentially detectable features having a known geometric relationship to each other.

Next a relationship of the calibrated target to the calibration geometric element is determined, and the calibrated target is moved adjacent a geometric feature of an object desired to be characterized. Then photogrammetry is applied to the calibrated target features and the desired geometric feature to spatially characterize the desired geometric feature.

Another embodiment of the invention is a system for characterizing a geometric element of an object. The system comprises a movable calibrated target comprising at least two differentially detectable features having a known geometric relationship to each other. The system also comprises a photogrammetric analysis system for determining a relationship of the calibrated target to a calibration geometric element. The analysis system is also for spatially characterizing a geometric feature of an object desired to be characterized using the calibrated target features.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIGS. 7A–7L illustrate four types of feature targets (Table 1): plane (FIGS. 7A–7C); edge (FIGS. 7D–7F); corner (FIGS. 7G–7I); and circle (FIGS. 7J–7L).

FIG. 9A illustrates fixture measurement; FIG. 9B, an in-line car body inspection.

DETAILED DESCRIPTION OF THE PREFERRED EMBODIMENTS

Figure 1:
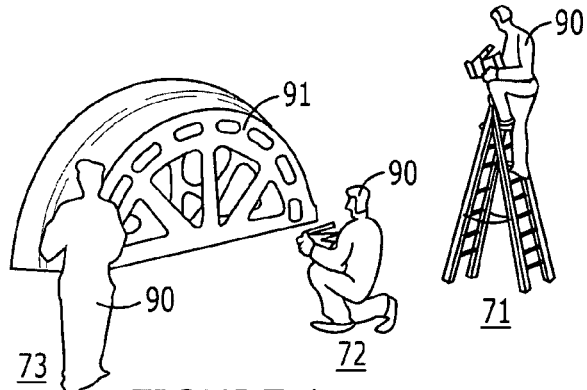
FIG. 1 (prior art) illustrates the process of sequential photogrammetry.

A description of the preferred embodiments of the present invention will now be presented with reference to FIGS. 4A–15B.

Feature targets (FTs) are identified with the use of a "code target," which comprises a unique, calibratable pattern of geometric shapes, such as, but not intended to be limited to, squares, and a substantially central dot. The important element in the shapes is that there be at least two different shapes, preferably a unitary shape comprising a first shape and a plurality of shapes comprising a second shape.

Means are provided for automatically detecting the patterns and for identifying and measuring them by image processing techniques (Fraser 1997a,b).

The addition of such a target to an adaptor makes it possible to identify that adaptor in a measurement. There are advantages to automating the use and reduction of these adaptors. Once an FT is identified, a calibration file associated therewith is used to determine the type and function of that particular target adaptor.

A first embodiment of the FT 10 is for measuring a plane. This FT (FIGS. 4A–4C) comprises a planar base 11, comprising, for example, a flat piece of aluminum. The top side 121 of the base 11 has a plurality of coded targets 12,12' thereon (FIG. 4A); the bottom side 122 of the base 11 has at least one magnet 13 embedded therein to hold the FT 10 in place. This positioning device is exemplary and is not intended to be limiting, and it will be understood by one of skill in the art that alternate affixing methods are able to be substituted therefor, such as an adhesive for affixing to nonmetallic portions of objects. The relationship between the targets 12,12' on the top side 121 of the base 11 and the plane represented by the base 11 is determined by a one-time calibration.

Figure 5:
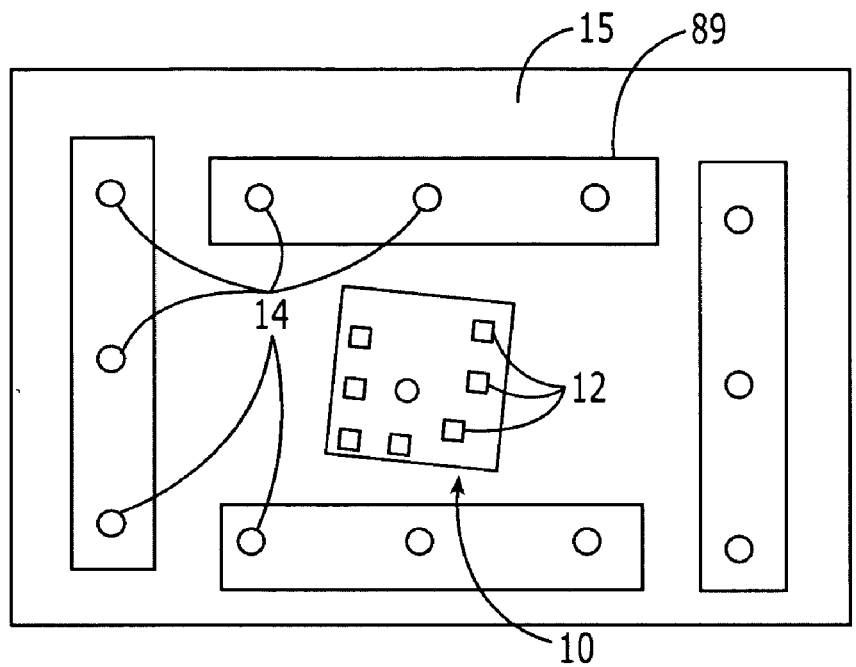
FIG. 5 illustrates an exemplary calibration setup.

The FT 10 is placed on a flat surface 89 such as granite (FIG. 5). Retroreflective targets 14 are placed adjacent the FT 10 and are used to define a "local" plane 15. A photogrammetric measurement is then made to determine the location of the face targets 12 relative to the local plane 15, which thus serves as a calibration geometric element for a planar surface.

Figure 6:
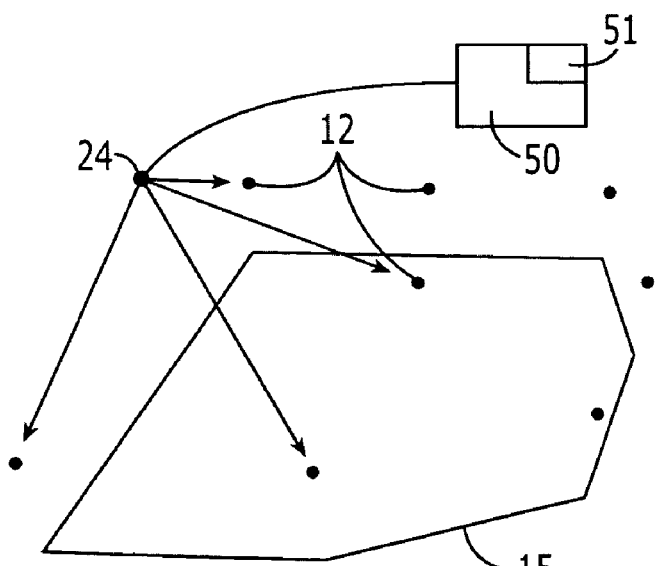
FIG. 6 illustrates a calibration file for the setup of FIG. 5.

With the relationship between the targets 12,14 and the local plane 15 known, the coded target and its adaptor form a feature target 10 capable of directly measuring any plane to which it is attached. The relationship between the targets 12 and the plane 15 is shown in FIG. 6, as measured by a camera at station 24.

Figure 2:
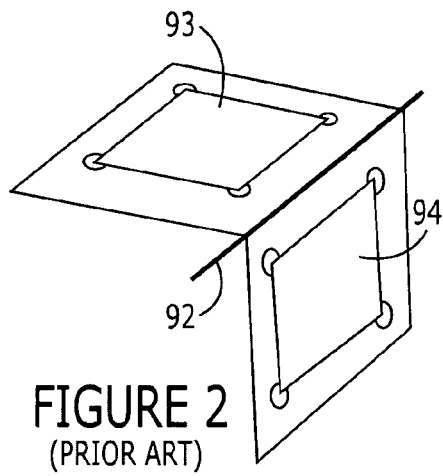
FIG. 2 (prior art) shows the use of a plane—plane intersection to derive the location of an edge.
Figure 3A:
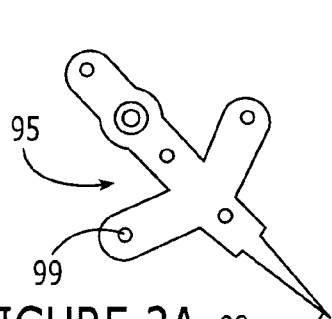
FIGS. 3A–3C (prior art) illustrate three exemplary configurations of hand-held probes.
Figure 3B:
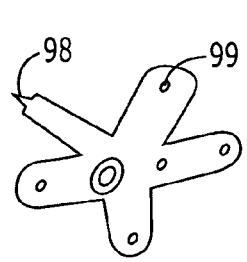
Figure 3C:
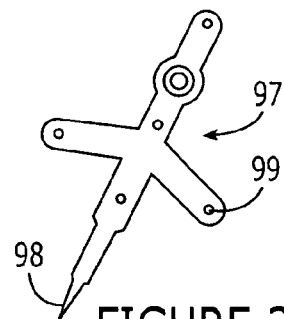
Figure 4A:
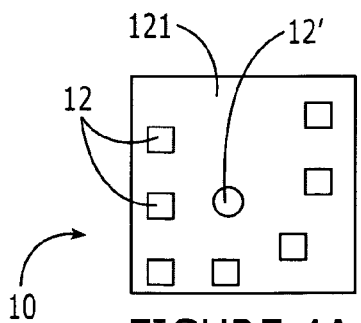
FIGS. 4A–4C illustrate a plane target's top view (FIG. 4A), rear view (FIG. 4B), and side view (FIG. 4C).
Figure 4B:
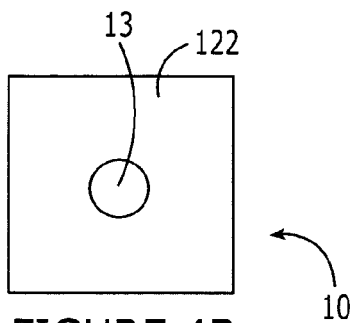
Figure 4C:
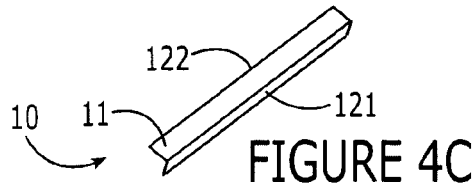

In an alternate embodiment, if a right-angle bracket is used instead of a flat plate, the resulting FT 10 after calibration can measure a plane at right angles to the face targets. Multiple FTs can be placed on a block, and the feature planes they measure intersected to form a line 92 as shown in FIG. 2.

The face targets 12 can be in any orientation to the plane that needs to be defined. For example, it might be desired to have the FT at a 45° angle to the plane. In fact, the targets 12 can be in any relative orientation providing that they can be calibrated and are thus predetermined at the time of the desired characterization.

At run time, a local transformation is performed for each of the FTs found. This transformation uses the calibrated and measured values of the face targets 12 to transfer the plane, line, or feature desired into the global coordinate system of the measured object. Photogrammetric software 51 is known in the art that can be resident on a processor 50 for performing the requisite calculations, the processor 50 in electronic communication with the camera stations 24.

Figure 7J:
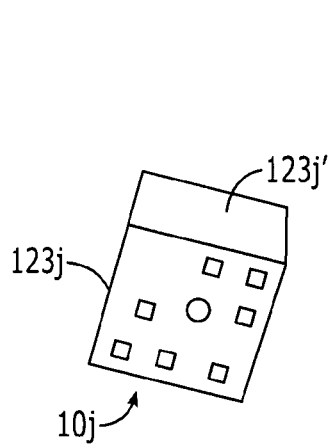

Four exemplary types of FTs are given in Table 1 and FIGS. 7A–7K. Exemplary advantageous features of FTs are given in Table 2. In FIGS. 7A–7C planar FTs 10a,10b,10c are used to define contact planes 123a,123b,123c, with the bases 11a,11b,11c shown at 0°, 90°, and 45°, respectively.

Edge definitions are provided (FIGS. 7D–7F) by using FTs 10d,10e,10f to define two contact planes 123d,123d'; 123e,123e';123f,123f' each, and then deriving their intersection, which comprises the desired edge 124a,124b,124c. FT 10d is a mirror image of FT 10e, both having angles of substantially 90° between the contact planes. FT 10f is a tilted view of a target having an angle between the planes less than 90°.

Corner definitions are provided (FIGS. 7G–7I) with three contact planes 123g,123g',123g" to define two edges 123h, 123h', from which in turn are derived the corresponding corner 123i.

Figure 7K:
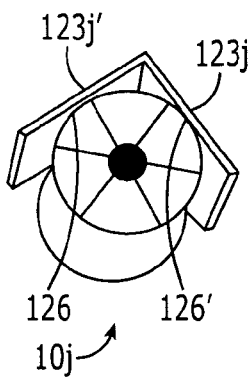
Figure 7L:
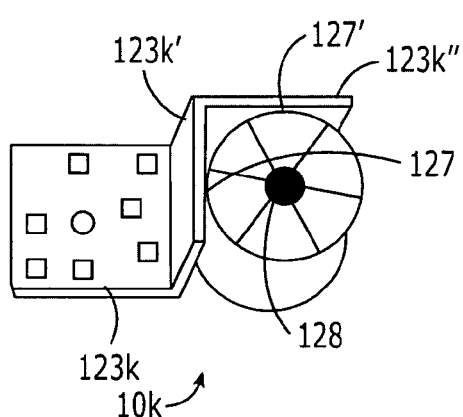

A center point 128 of a circle, or of a cylindrical object 125, for example, may be defined with the use of an FT 10j having two planes 123j,123j' at substantially right angles (FIGS. 7J,7K) or an FT 10k having three planes 123k,123k', 123k" at substantially right angles to each other (FIG. 7L). In both cases the cylindrical object 125 is surrounded by two of the planes, creating thereby two contact points 126,126'; 127,127' at tangent points. From the positions of these contact points 126,126';127,127', as determined photogrammetrically, the radius and thereby the center point 128 may be derived.

TABLE 1

Exemplary Types of Feature Targets

| Type | FIG. | Function |
|---|---|---|
| Plane | FIGS. 7A–7C | contact plane defined |
| Edge | FIGS. 7D–7F | two contact planes and their intersection are defined |
| Corner | FIGS. 7G–7I | three contact planes, two edges, and the corresponding corner are defined |
| Circle | FIGS. 7J–7L | the center point of a circle with known radius is defined |

TABLE 2

Feature Target Features

| | |
|---|---|
| Fast | Measurement with FTs is much faster than with other methods. The setup time for sequential photogrammetry is very low compared with other in-place measurement systems. Using FTs to measure features is faster and easier in many applications than probing the feature. Photography is usually very quick. Finally, analysis is completely automated so that it is both fast and error-free. |
| Higher accuracy | The accuracy obtained is higher than normal probed data because the FT is measured from multiple locations, and many points are used to define the feature. |
| Line of Sight | FTs can be configured and used to eliminate many line-of-sight problems. |
| Versatile | The method is extremely versatile in both its use and application. FTs can be configured to meet many measuring requirements. |
| Minimal downtime | The fast overall measurement and analysis time means critical production downtime is minimized. |
| Enhanced targeting | FTs can measure features that cannot be directly targeted. |
| Repeat measurement | The ability to automate measurements through construction macros (Ganci and Handley, 1998) makes FTs ideal for repeat production measurements. |

As an example of a use of the system and method of the present invention, FTs can be used to measure NC blocks on automotive fixtures. A target is placed on each block or surface desired to be measured. The target is preferably selected depending upon the data desired and the viewing angles available to the block. For example, for blocks having nonperpendicular faces, it is customary to use a combination of FTs. For pin or circle measurements it is necessary to specify the correct radius at the calibration phase, which may be obtained, for example, from the design data.

Figure 8A:
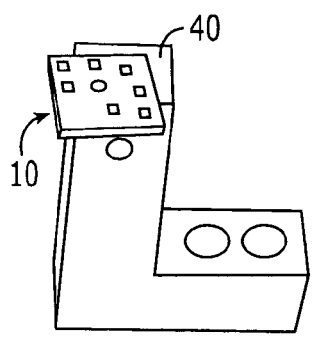
FIGS. 8A–8H illustrate sample FT solutions: for measuring a plane (FIGS. 8A,8B), an edge (FIG. 8C), a corner (FIGS. 8D, alone, and 8E,8F, together), a complex corner (FIG. 8G), and a centerline (FIG. 8H).
Figure 8C:
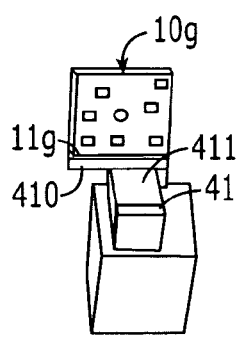
Figure 8B:
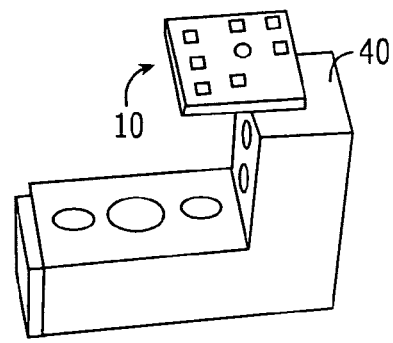
Figure 8D:
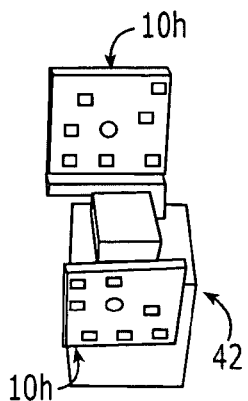
Figure 8E:
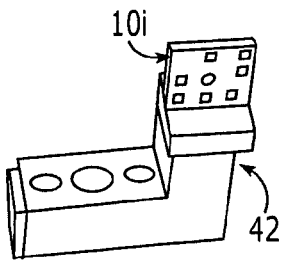
Figure 8F:
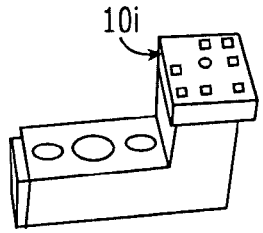
Figure 8G:
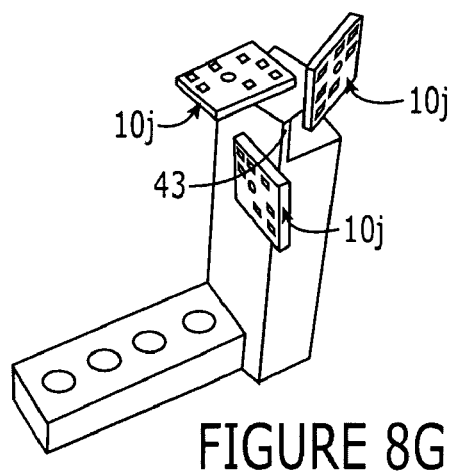
Figure 8H:
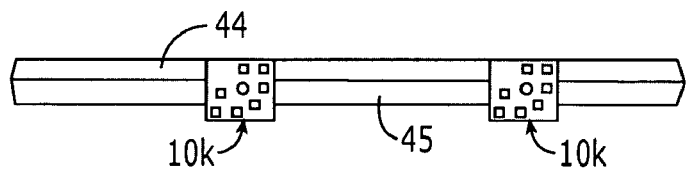

Sample FT solutions are given in FIGS. 8A–8H. As indicated above, a plane 40 may be measured with one FT 10 positioned on the plane 40, so long as the FT 10 has been properly calibrated (FIGS. 8A,8B); an edge 41 may be measured with an FT 10g having a first face 410 of the base 11g at right angles to a second face 411 of the base 11g (FIG. 8C); a corner 42 may be measured in one step with two FTs 10h (FIG. 8D) or in two steps with a single FT 10i (FIGS. 8E and 8F); a complex corner 43 may be measured in one step with three FTs 10j (FIG. 8G); and a centerline 44 of a cylindrical object 45, or a cylindrical portion of an object, may be measured with in one step with two FTs 10k (FIG. 8H).

Figure 9A:
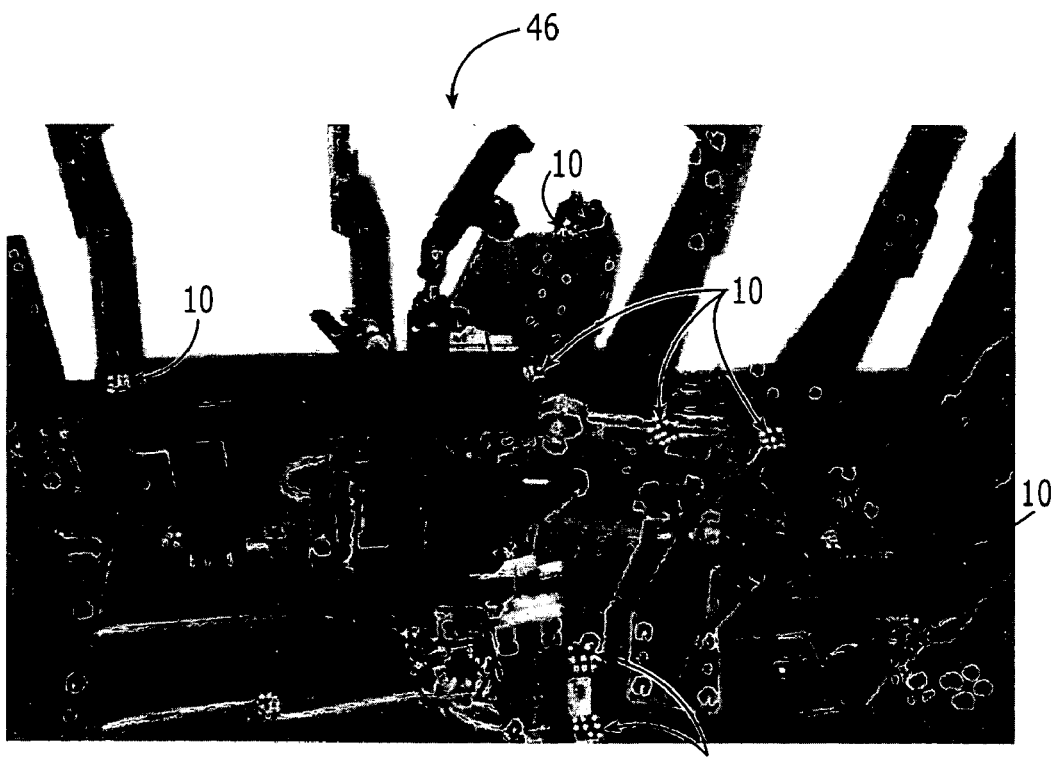
FIGS. 9A,9B illustrate two case studies (Table 3)
Figure 9B:
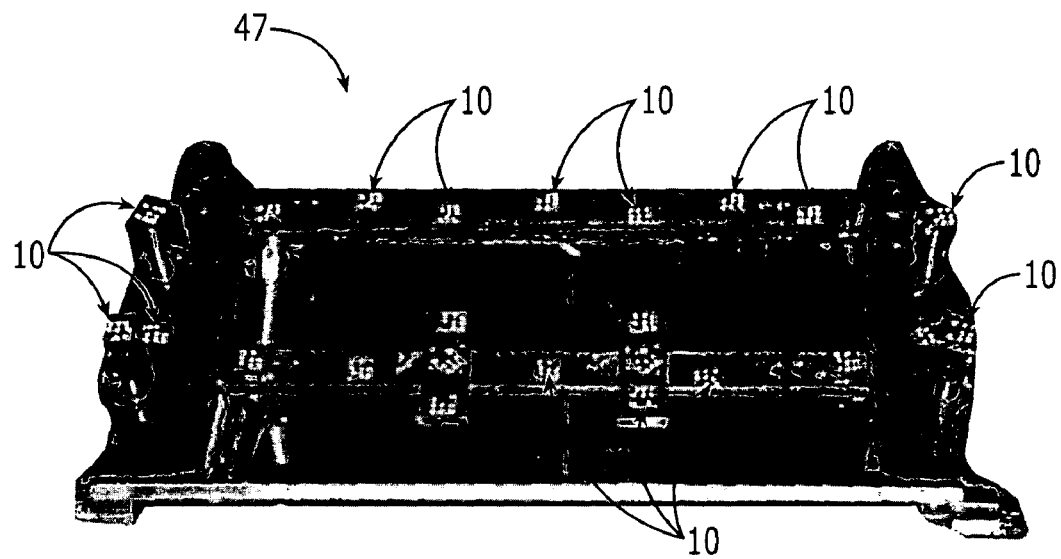

Two exemplary test case studies are illustrated in Table 3 and FIGS. 9A and 9B. For these two studies the FT concept of the present invention was believed preferable to other known prior art measurements. In FIG. 9A, a plurality of FTs 10 are positioned around the components of the device 46, permitting complex feature analysis without a hand-held probe. In FIG. 9B, an axle carrier 47 also has a plurality of FTs 10 positioned thereon.

TABLE 3

Overview of Two Case Studies

| Case study | Object, FIG. | Objectives |
|---|---|---|
| Case 1: Fixture measurement | FIG. 9A | 1. Use FTs to inspect the fixture<br>2. Complete the inspection in less time than the current inspection system |
| Case 2: In-line car body inspection | FIG. 9B | 1. Use FTs to inspect the underbody of a vehicle during assembly (in-line)<br>2. Complete the measurement in less than the production time of 5 min |

In Case 1 (FIG. 9A), analysis of production tooling requires a fast and efficient measurement system. The driving factors are time and availability for analysis. Case 2 (FIG. 9B) illustrates the need for immediate information for decision making during production. In both cases the need for uninterrupted production schedules is deemed extremely important.

In the case of production tooling measurement, unavailability of tooling during after-shift hours due to routine maintenance needs, and constantly changing production schedules due to high product demand, has forced inspection personnel into working during scheduled break times. This means finding a way to measure a tool during a normal 40-min lunch break with the goal of eventually completing the measurement during a 10-min coffee break.

The ability to flexibly analyze product deviation in-line is the focus of the second case study. Increasingly, inspection is needed at the point of origin in order to efficiently determine the cause of the deviation and set corrective action. Typical problems facing dimensional inspection include flexibility and time. The system needs to be set up quickly and measure in unstable environments, such as constantly moving assembly lines. It also needs to be able to complete the measurement between assembly processes.

Case 1. In this study a 1.8-m-long panel-holding fixture (FIG. 9A) is desired to be measured, to determine the location of features such as corners, edges, and planes on the fixture.

An FT 10 was placed on each of the desired features. Where possible, one was used. For features without a suitable target, the necessary data were created using a combination of FTs.

Figure 10:
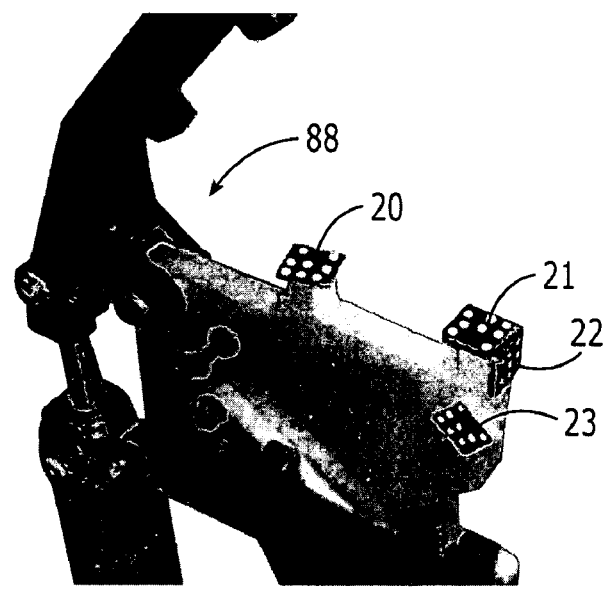
FIG. 10 is a side perspective view of a sample clamping mechanism.

An exemplary sample clamping mechanism is illustrated in FIG. 10, wherein four FTs 20–23 are shown. The FT 20 at the back of the clamp 88 is used to define a contact plane. The three remaining FTs 21–23 define the hard corner of the clamping surface. The fixture measurement required a total of 40 FTs to measure all the desired features.

Figure 11:
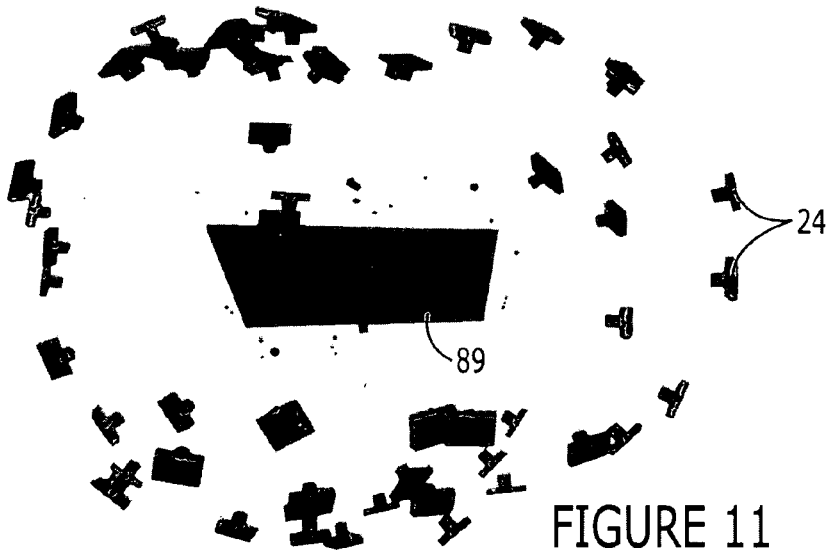
FIG. 11 illustrates a camera station network for the system of FIG. 10.

After targeting a total of 60 photographs were taken of the fixture 88. The number of photographs taken depends on the complexity of the measurement and accuracy requirements. The photography for the fixture 89 was completed in approximately 5 min. Camera station locations 24 for the measurement are shown in FIG. 11.

Statistics from the measurement of the fixture 89 are as follows:

| | |
|---|---|
| No. of photos | 60 |
| No. of FTs | 40 |
| No. of scales | 2 |
| Scale agreement | 0.01 mm |
| Accuracy rms (mm) xyz | x 0.010 |
| | y 0.009 |
| | z 0.008 |

Figure 12A:
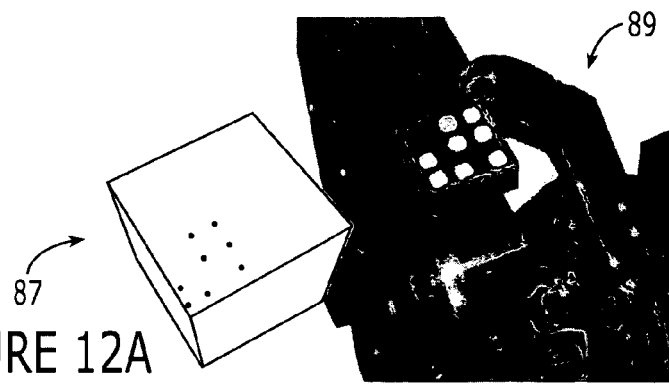
FIGS. 12A,12B show the measurement of two features on the system of FIG. 10.
Figure 12B:
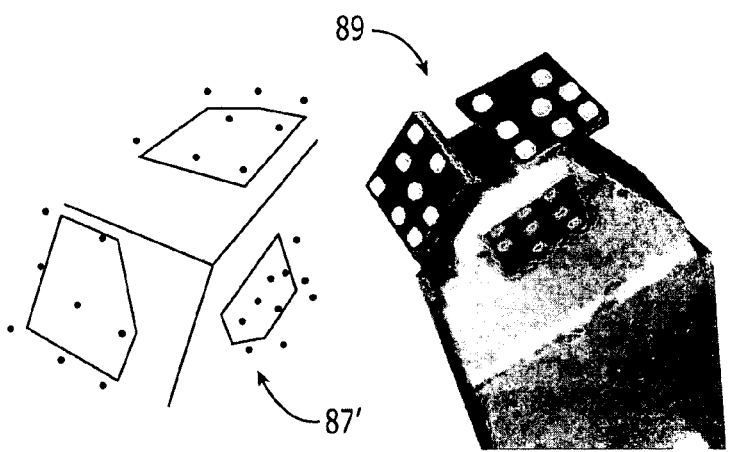

Some of the features measured on the fixture 89 are shown in FIGS. 12A and 12B, along with the corresponding FT analyses 87,87'.

To obtain a better idea of the time savings of the FTs of the present invention, the same measurement was completed using conventional stick-on targeting and a multicamera probe system. The probes were needed to collect data on the features that could not be targeted. A comparison of the two measurements is given in Table 4, wherein it is clear that the FT system is much faster. The automated analysis of the FTs especially saves time while also eliminating measurement errors.

TABLE 4

Comparison of the Two Measurements

| Measurement type | FT solution | Stick-on and probes |
|---|---|---|
| Number of targets | 40 FTs | 320 |
| Targeting | 5 min | 25 min |
| Probing | — | 15 min |
| Target removal | 3 min | 20 min |
| Photography | 2 min | 2 min |
| Processing | 2 min | 3 min |
| Analysis | 3 min | 30 min |
| Total time | 15 min | 95 min |

Figure 13:
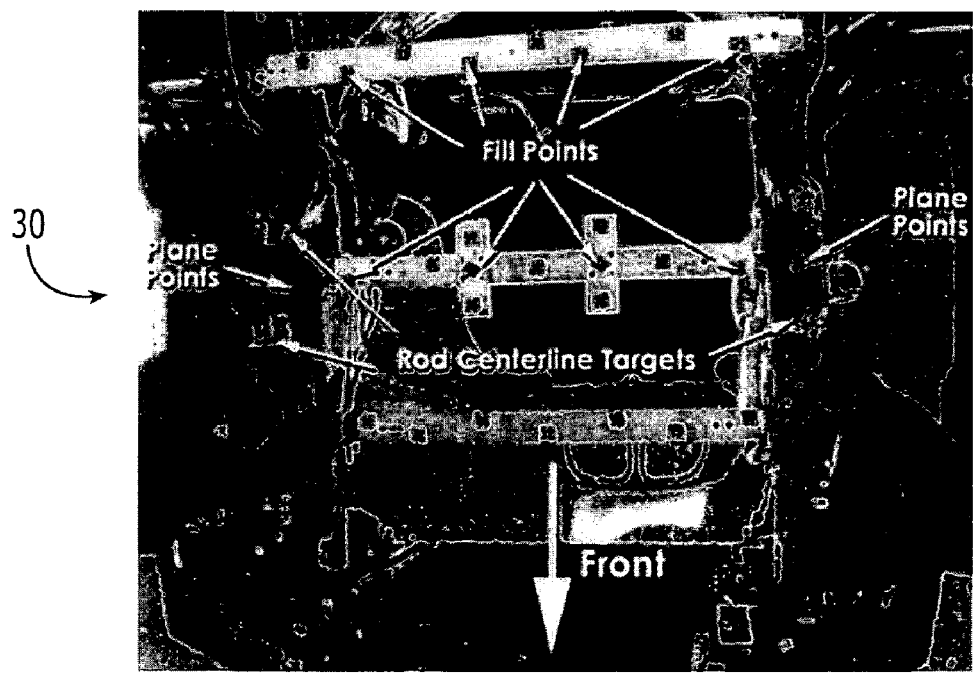
FIG. 13 illustrates a test unit for measuring features of an axle carrier on an automobile.

Case 2. This case study is a production measurement, wherein FTs were used to measure a front axle carrier 86 of an automobile, here, a BMW Z3. This test was performed to examine whether in-line measurements could be used to identify cars with bushing angle problems. Rectifying these problems early in the production process would ultimately result in significant scrap value savings farther down the line. The test unit 30 is shown in FIG. 13.

The measurement was desired to be performed within a time period the car would be idle at a station. A total of 5 min was set aside for targeting, photography, and tear down. Processing the images to yield the desired data was not necessary during the 5-min time limit.

Figure 14:
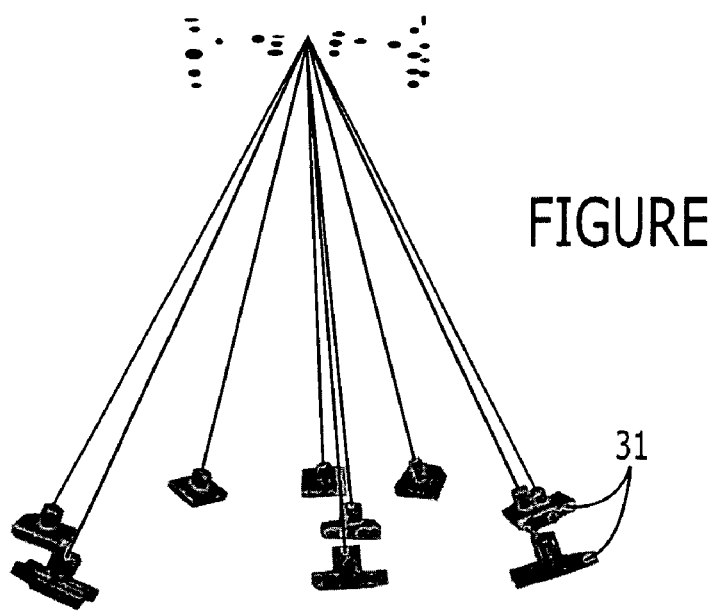
FIG. 14 shows the camera station network for FIG. 13.

Two operators performed the measurement. The targeting and tear down were completed in approximately 2 min. A total of 18 photographs were collected in less than 2 min with the network 31 used is shown in FIG. 14. A summary of statistics from the measurement follows:

| | |
|---|---|
| No. of photos | 18 |
| No. of FTs | 8 |
| No. of scales | 8 |
| Scale agreement | 0.01 mm |
| Accuracy rms (mm) xyz | x 0.008 |
| | y 0.007 |
| | z 0.017 |

Figure 15A:
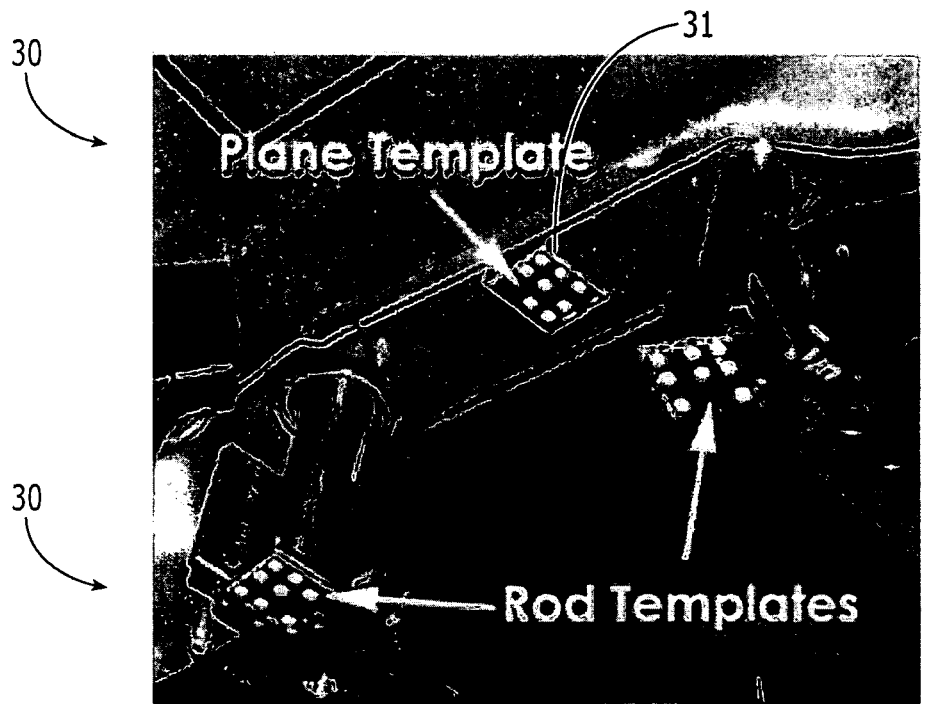
FIG. 15A shows key measurement features of the system of FIG. 13.
Figure 15B:
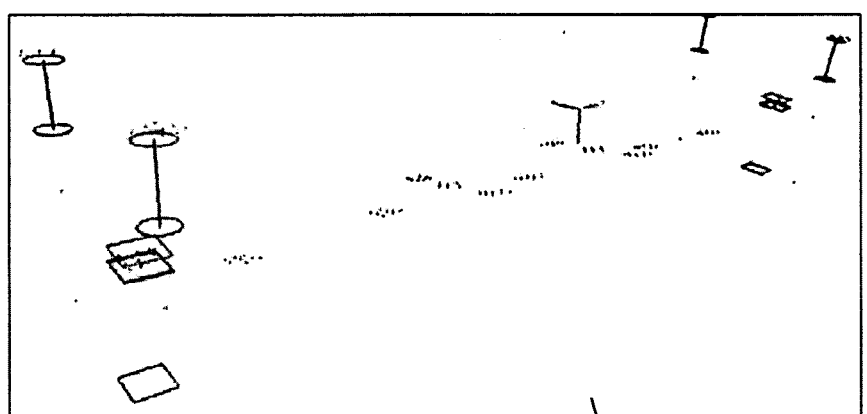
FIG. 15B shows geometric reductions for the features of FIG. 12A.

Once the processing is finished, the desired features are automatically generated. In this case six planes, eight circles, and four lines were created. The feature generation is shown in FIGS. 15A and 15B, wherein the key measurement features are shown in FIG. 15A, with plane template 31 and two rod templates 32 attached to the axle carrier 30 and the corresponding geometric reductions 33 in FIG. 15B.

It can be seen that all the objectives of the study were met, illustrating how FTs could be used to automate and significantly reduce the amount of time needed to complete a measurement.

REFERENCES

Brown, J., 1998. V-STARS/S Acceptance Results. Boeing Large Scale Optical Metrology Seminar, Seattle.

Fraser, C. S., 1997a. Automation in Digital Close Range Photogrammetry. First Trans Tasmin Surveyors Conf., 12–18.

Fraser, C. S., 1997b. Innovations in Automation for Vision Metrology Systems. *Photogrammetric Record* 15(90): 901–11.

Ganci, G., and Brown, J., 2000. Developments in Non-Contact Measurement Using Videogrammetry. Boeing Large Scale Optical Metrology Seminar, Long Beach.

Ganci, G., and Handley, H. B., 1998. Automation in Videogrammetry, *Intl. Arch. Photogrammetry and Remote Sensing*, Hakodate 32(5): 53–58.

It may be appreciated by one skilled in the art that additional embodiments may be contemplated, including alternate shapes and configurations of the feature target and camera positions.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A method for characterizing a geometric element of an object comprising the steps of:
   positioning a target adjacent a calibration geometric element, the target comprising at least two differentially detectable features having a known geometric relationship to each other;
   calibrating the target by determining a relationship of the target features to the calibration geometric element of the object;
   moving the calibrated target adjacent a geometric feature of an object desired to be characterized; and
   applying photogrammetry to the target features and the desired geometric feature to spatially characterize the desired geometric feature.

2. The method recited in claim 1, wherein the relationship-determining step comprises:
   positioning the target at least partially upon the calibration geometric element;
   applying detectable features to the calibration geometric element; and
   applying photogrammetry to the target features and the calibration geometric element features to determine a relationship between the target and the calibration geometric element.

3. The method recited in claim 1, wherein the photogrammetry-applying step comprises the steps of:
   taking at least two photographs of a portion of the object, each photograph containing the target features and at least a portion of the desired geometric feature, each photograph taken from a different perspective relative to the object;
   calculating relative positions of the target features and the desired geometric feature; and
   performing a geometric calculation on the relative positions to determine spatial coordinates of the geometric element.

4. The method recited in claim 3, wherein the photograph-taking step comprises taking digital photographs, and wherein the calculating and performing steps are performed in a computer having photogrammetric analysis software resident therein.

5. The method recited in claim 1, wherein the target features comprise imagable shapes.

6. The method recited in claim 5, wherein the target features comprise a unitary first feature having a first shape and a plurality of second features having a second shape different from the first shape.

7. The method recited in claim 6, wherein the first feature is positioned substantially centrally on the calibrated target.

8. The method recited in claim 7, wherein a first one of the second features is positioned at a first distance from the first feature and a second one of the second features is positioned at a second distance from the feature unequal to the first distance.

9. The method recited in claim 1, wherein the calibration geometric element has a substantially planar face and the target features are substantially coplanar.

10. The method recited in claim 9, wherein the desired feature comprises a plane, and the target moving step comprises moving at least a portion of the target onto the plane.

11. The method recited in claim 9, wherein the desired feature comprises a plane and the target moving step comprises moving the target to a position perpendicular to the plane.

12. The method recited in claim 9, wherein:
    the desired feature comprises an edge formed by a first plane and a second plane;
    the target moving step comprises moving at least a portion of the target into a known relationship with the first plane; and
    the photogrammetry-applying step comprises spatially characterizing the first plane; and further comprising the steps, following the photogrammetry-applying step, of:
    moving the target adjacent the second plane;
    applying photogrammetry to the target features and the second plane to spatially characterize the second plane; and
    analyzing the characterizations of the first and the second plane to determine a spatial characterization of the edge.

13. The method recited in claim 9, wherein:
    the desired feature comprises a corner formed by a first plane, a second plane, and a third plane;
    the target moving step comprises moving at least a portion of the target into a known relationship with the first plane; and
    the photogrammetry-applying step comprises spatially characterizing the first plane; and further comprising the steps, following the photogrammetry-applying step, of:
    moving the target adjacent the second plane;
    applying photogrammetry to the target features and the second plane to spatially characterize the second plane;
    analyzing the characterizations of the first and the second plane to determine a spatial characterization of a first edge formed by the first and the second plane;
    moving the target adjacent the third plane;
    applying photogrammetry to the target features and the third plane to spatially characterize the third plane;
    analyzing the characterizations of the first and the third plane to determine a spatial characterization of a second edge formed by the first and the third plane; and
    analyzing the characterizations of the first and the second edges to spatially characterize the corner formed by the first, the second, and the third planes.

14. The method recited in claim 9, wherein:
    the desired feature comprises a center point of a circular object;
    the target has a first planar face containing the target features and a second planar face joined to the first planar face at a known angle;
    the target moving step comprises moving at least a portion of the target so that both the first face and the second face are in contact with the circular object at a first and a second tangent point, respectively; and
    the photogrammetry-applying step comprises spatially characterizing the first face and the first tangent point; and further comprising the step, following the photogrammetry-applying step, of:
    analyzing the characterizations of the first plane and the first tangent point to determine a spatial characterization of the center point of the circular object.

15. The method recited in claim 9, wherein:
    the desired feature comprises a center line of a substantially cylindrical object;
    the target moving step comprises moving at least a portion of the target to a first location against the cylindrical object;
    the photogrammetry-applying step comprises spatially characterizing a first center point of the cylindrical object; and further comprising the steps, following the photogrammetry-applying step, of:

again moving the target to a second location against the cylindrical object in spaced relation from the first location;

applying photogrammetry to the target features to spatially characterize a second center point of the cylindrical object; and analyzing the characterizations of the first and the second center points to determine a spatial characterization of the cylindrical object center line.

16. A method for characterizing a geometric element of an object comprising the steps of:

moving a calibrated target into a known geometric relationship with a geometric feature of an object desired to be characterized, the calibrated target comprising at least two differentially detectable features having a known geometric relationship to each other, the features further having a known geometric relationship to a surface of the object; and applying photogrammetry to the calibrated target features and the desired geometric feature to spatially characterize the desired geometric feature.

17. The method recited in claim 16, wherein the photogrammetry-applying step comprises the steps of:

taking at least two photographs of a portion of the object, each photograph containing the calibrated target features and at least a portion of the desired geometric feature, each photograph taken from a different perspective relative to the object;

calculating relative positions of the calibrated target features and the desired geometric feature; and performing a geometric calculation on the relative positions to determine spatial coordinates of the geometric element.

18. The method recited in claim 17, wherein the photograph-taking step comprises taking digital photographs, and wherein the calculating and performing steps are performed in a computer having photogrammetric analysis software resident therein.

19. The method recited in claim 16, wherein the calibrated target features comprise imagable shapes.

20. The method recited in claim 19, wherein the calibrated target features comprise a unitary first feature having a first shape and a plurality of second features having a second shape different from the first shape.

21. The method recited in claim 20, wherein the first feature is positioned substantially centrally on the calibrated target.

22. The method recited in claim 21, wherein a first one of the second features is positioned at a first distance from the first feature and a second one of the second features is positioned at a second distance from the feature unequal to the first distance.

23. The method recited in claim 16, wherein the calibrated target features are substantially coplanar.

24. The method recited in claim 16, wherein the desired feature comprises a plane, and the calibrated target moving step comprises moving at least a portion of the calibrated target onto the plane.

25. The method recited in claim 16, wherein the desired feature comprises a plane and the calibrated target moving step comprises moving the calibrated target to a position perpendicular to the plane.

26. The method recited in claim 16, wherein:

the desired feature comprises an edge formed by a first plane and a second plane;

the calibrated target moving step comprises moving at least a portion of the calibrated target into a known relationship with the first plane; and the photogrammetry-applying step comprises spatially characterizing the first plane; and further comprising the steps, following the photogrammetry-applying step, of:

again moving the calibrated target adjacent the second plane;

applying photogrammetry to the calibrated target features and the second plane to spatially characterize the second plane; and analyzing the characterizations of the first and the second plane to determine a spatial characterization of the edge.

27. The method recited in claim 16, wherein:

the desired feature comprises a corner formed by a first plane, a second plane, and a third plane;

the calibrated target moving step comprises moving at least a portion of the calibrated target into a known relationship with the first plane; and the photogrammetry-applying step comprises spatially characterizing the first plane; and further comprising the steps, following the photogrammetry-applying step, of:

again moving the calibrated target adjacent the second plane;

applying photogrammetry to the calibrated target features and the second plane to spatially characterize the second plane;

analyzing the characterizations of the first and the second plane to determine a spatial characterization of a first edge formed by the first and the second plane;

again moving the calibrated target adjacent the third plane;

applying photogrammetry to the calibrated target features and the third plane to spatially characterize the third plane;

analyzing the characterizations of the first and the third plane to determine a spatial characterization of a second edge formed by the first and the third plane; and analyzing the characterizations of the first and the second edges to spatially characterize the corner formed by the first, the second, and the third planes.

28. The method recited in claim 16, wherein:

the desired feature comprises a center point of a circular object;

the calibrated target has a first planar face containing the target features and a second planar face joined to the first planar face at a known angle;

the calibrated target moving step comprises moving at least a portion of the calibrated target so that both the first face and the second face are in contact with the circular object at a first and a second tangent point, respectively; and the photogrammetry-applying step comprises spatially characterizing the first face and the first tangent point; and further comprising the step, following the photogrammetry-applying step, of:

analyzing the characterizations of the first plane and the first tangent point to determine a spatial characterization of the center point of the circular object.

29. The method recited in claim 16, wherein:

the desired feature comprises a center line of a substantially cylindrical object;

the calibrated target moving step comprises moving at least a portion of the calibrated target to a first location against the cylindrical object;

the photogrammetry-applying step comprises spatially characterizing a first center point of the cylindrical object; and further comprising the steps, following the photogrammetry-applying step, of:

again moving the calibrated target to a second location against the cylindrical object in spaced relation from the first location;

applying photogrammetry to the calibrated target features to spatially characterize a second center point of the cylindrical object; and analyzing the characterizations of the first and the second center points to determine a spatial characterization of the cylindrical object center line.

30. A system for characterizing a geometric element of an object comprising:

a movable calibrated target comprising at least two differentially detectable features having a known geometric relationship to each other; and a photogrammetric analysis system for:

determining a relationship of the calibrated target to a calibration geometric element; and spatially characterizing a geometric feature of an object desired to be characterized using the calibrated target features by calculating relative positions of the calibrated target features and the desired geometric feature and for performing a geometric calculation on the relative positions to determine spatial coordinates of the geometric element.

31. The system recited in claim 30, further comprising detectable features applicable to the calibration geometric element for facilitating the determination of the relationship of the calibrated target to the calibration geometric element.

32. The system recited in claim 30, wherein the photogrammetric analysis system comprises at least one camera for taking at least two photographs of a portion of the object, each photograph containing the calibrated target features and at least a portion of the desired geometric feature, each photograph taken from a different perspective relative to the object.

33. The system recited in claim 32, wherein the camera comprises a digital camera, and wherein the photogrammetric analysis system further comprises a computer and photogrammetric analysis software resident in the computer.

34. The system recited in claim 30, wherein the calibrated target features comprise imagable shapes.

35. The system recited in claim 34, wherein the calibrated target features comprise a unitary first feature having a first shape and a plurality of second features having a second shape different from the first shape.

36. The system recited in claim 35, wherein the first feature is positioned substantially centrally on the calibrated target.

37. The system recited in claim 36, wherein a first one of the second features is positioned at a first distance from the first feature and a second one of the second features is positioned at a second distance from the feature unequal to the first distance.

38. The system recited in claim 30, wherein the calibration geometric element has a substantially planar face and the calibrated target features are substantially coplanar.

39. The system recited in claim 30, wherein the calibrated target further comprises means for affixing the calibrated target to a portion of the object.

40. The system recited in claim 39, wherein the affixing means comprises a magnet for affixing to a metallic object.

41. The system recited in claim 39, wherein the affixing means comprises an adhesive.

42. The system recited in claim 30, wherein the calibrated target comprises a substantially planar target element and a planar base affixed to the target element at a predetermined angle.

43. The system recited in claim 30, wherein the calibrated target has a first planar face containing the target features and a second planar face joined to the first planar face at a known angle.

* * * * *